United States Patent
Ren et al.

(10) Patent No.: US 7,712,311 B2
(45) Date of Patent: May 11, 2010

(54) TURBOCHARGER ASSEMBLY WITH CATALYST COATING

(75) Inventors: Shouxian Ren, Ann Arbor, MI (US); Carnell E. Williams, Pontiac, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 213 days.

(21) Appl. No.: 11/685,839

(22) Filed: Mar. 14, 2007

(65) Prior Publication Data
US 2008/0223037 A1 Sep. 18, 2008

(51) Int. Cl.
| F02D 23/00 | (2006.01) |
| F01N 5/04 | (2006.01) |
| F01N 3/24 | (2006.01) |
| F01N 3/10 | (2006.01) |
| F01N 3/28 | (2006.01) |
| F01D 1/02 | (2006.01) |
| F01D 25/04 | (2006.01) |
| F01D 5/28 | (2006.01) |
| F04D 29/54 | (2006.01) |
| F04D 29/44 | (2006.01) |
| B01J 37/02 | (2006.01) |
| B01J 37/00 | (2006.01) |
| F02B 37/00 | (2006.01) |

(52) U.S. Cl. ............ 60/602; 60/605.1; 60/280; 60/278; 415/200; 415/206; 416/241 R; 502/100; 502/102

(58) Field of Classification Search ......... 60/602, 60/605.2, 280, 278, 605.1; 415/200, 206; 416/241 R; 502/100–102, 200
See application file for complete search history.

(56) References Cited

U.S. PATENT DOCUMENTS

| 2,553,742 | A | * | 5/1951 | Bloch | 415/119 |
| 3,178,882 | A | * | 4/1965 | Milligan | 417/406 |
| 3,346,175 | A | * | 10/1967 | Wiles | 415/200 |
| 3,362,629 | A | * | 1/1968 | Papapanu | 415/207 |
| 4,122,673 | A | * | 10/1978 | Leins | 416/241 R |
| 4,245,953 | A | | 1/1981 | Milton et al. | 415/144 |
| 4,699,839 | A | * | 10/1987 | Hornberger | 428/312.8 |
| 4,910,959 | A | * | 3/1990 | Dones | 60/280 |
| 4,971,939 | A | * | 11/1990 | Fridez et al. | 502/200 |
| 5,059,095 | A | * | 10/1991 | Kushner et al. | 416/241 B |
| 5,277,542 | A | * | 1/1994 | Nakanishi | 415/202 |
| 5,422,331 | A | * | 6/1995 | Galligan et al. | 502/333 |

(Continued)

FOREIGN PATENT DOCUMENTS

DE 19931150 A1 * 1/2001

(Continued)

*Primary Examiner*—Thai Ba Trieu
(74) *Attorney, Agent, or Firm*—Quinn Law Group, PLLC

(57) ABSTRACT

A turbocharger assembly is provided. The turbocharger assembly includes a turbine assembly having at least one internal aerodynamic surface and a compressor assembly having at least one internal aerodynamic surface. At least one of the at least one internal aerodynamic surface of the turbine assembly and the at least one internal aerodynamic surface of the compressor assembly is at least partially coated with a catalyst material. The internal aerodynamic surfaces of the turbine assembly may include a volute, variable geometry mechanism, turbine wheel, and outlet. The internal aerodynamic surfaces of the compressor assembly may include and inlet, compressor impeller, diffuser, variable geometry mechanism, and a volute. An internal combustion engine incorporating the disclosed turbocharger assembly is also provided.

3 Claims, 2 Drawing Sheets

U.S. PATENT DOCUMENTS

| | | | | |
|---|---|---|---|---|
| 5,520,516 | A * | 5/1996 | Taylor et al. | 416/241 B |
| 5,554,343 | A * | 9/1996 | Wade | 422/177 |
| 5,743,013 | A * | 4/1998 | Taylor et al. | 29/889.7 |
| 5,951,255 | A * | 9/1999 | Krenkel et al. | 416/241 A |
| 6,220,234 | B1 * | 4/2001 | Baker et al. | 415/200 |
| 6,679,057 | B2 | 1/2004 | Arnold | 415/158 |
| 6,818,252 | B1 * | 11/2004 | Bornstein et al. | 427/372.2 |
| 6,951,450 | B1 | 10/2005 | Figura et al. | 415/164 |
| 6,958,414 | B2 * | 10/2005 | Schliephake et al. | 562/545 |
| 7,024,855 | B2 | 4/2006 | Perrin et al. | 415/158 |
| 7,059,129 | B2 | 6/2006 | Zollinger et al. | 415/163 |
| 7,343,742 | B2 * | 3/2008 | Wimmer et al. | 60/605.2 |
| 7,406,826 | B2 * | 8/2008 | Hayashi et al. | 60/602 |
| 2002/0069851 | A1 * | 6/2002 | Doring et al. | 123/299 |
| 2002/0078934 | A1 * | 6/2002 | Hohkita et al. | 60/602 |
| 2005/0123397 | A1 | 6/2005 | McArdle et al. | 415/196 |
| 2006/0165524 | A1 * | 7/2006 | Pellkofer et al. | 415/206 |
| 2008/0022680 | A1 * | 1/2008 | Gingrich et al. | 60/605.2 |
| 2008/0127645 | A1 * | 6/2008 | Easley et al. | 60/605.2 |
| 2008/0236149 | A1 * | 10/2008 | Kyle | 60/299 |

FOREIGN PATENT DOCUMENTS

| | | | |
|---|---|---|---|
| GB | 2357120 A * | 6/2001 | |
| JP | 59010703 A * | 1/1984 | |
| JP | 01134004 A * | 5/1989 | |
| JP | 0810008 A * | 4/1996 | |
| JP | 2001193447 A * | 7/2001 | |
| KR | 2008054208 A * | 6/2008 | |
| WO | WO 2008006797 A1 * | 1/2008 | |
| WO | WO 2008125563 A1 * | 10/2008 | |

* cited by examiner

TURBOCHARGER ASSEMBLY WITH CATALYST COATING

TECHNICAL FIELD

The present invention relates to turbochargers for internal combustion engines.

BACKGROUND OF THE INVENTION

Internal combustion engines may use an exhaust driven compressor or turbocharger assembly to increase the manifold air pressure or MAP, thereby providing increased engine performance for a given engine displacement. A typical turbocharger assembly includes a turbine assembly in fluid communication with the exhaust gases and a compressor assembly in fluid communication with the inlet gases. A portion of the energy contained within the exhaust gases operate to spin or rotate a turbine wheel disposed within the turbine assembly. The turbine wheel is connected to a compressor impeller, disposed within the compressor assembly, through a common shaft. As such, the turbine wheel and compressor impeller rotate unitarily. In operation, as the exhaust gases rotate the turbine wheel, the rotating compressor impeller inducts or draws intake gases into the compressor assembly where it is pressurized for subsequent introduction to the internal combustion engine.

Recent advances in turbocharger design have led to the introduction of so-called variable geometry turbochargers. The variable geometry turbocharger typically includes a plurality of movable vanes disposed in one or both of the compressor assembly and turbine assembly, which operate to vary the operating characteristics of the turbocharger. Such variable geometry turbochargers may be effective in reducing so-called "turbo lag" in addition to improving the operating efficiency of the turbocharger assembly over a range of engine speeds. The accumulation of deposits, such as hydrocarbons and soluble organic fraction on the internal aerodynamic surfaces of the compressor housing and/or turbine housing may reduce the efficiency of the turbocharger and possibly cause sticking of the movable vanes contained therein.

SUMMARY OF THE INVENTION

A turbocharger assembly is provided having a turbine assembly with at least one internal aerodynamic surface and a compressor assembly having at least one internal aerodynamic surface. At least one of said at least one internal aerodynamic surface of said turbine assembly and said at least one internal aerodynamic surface of said compressor assembly is at least partially coated with a catalyst material operable to effect burn-off of hydrocarbon deposits.

The turbine assembly may include a turbine housing having a volute. The at least one internal aerodynamic surface of said turbine assembly may be at least partially defined by said volute of said turbine housing. Additionally the turbine housing may define an outlet at least partially defining the internal aerodynamic surface of the turbine assembly. The turbine assembly may further include a turbine wheel and variable geometry mechanism each of which may partially define the internal aerodynamic surface of the turbine assembly. The variable geometry mechanism of the turbine assembly may include a plurality of movable vanes.

The compressor assembly may include a compressor housing having a volute. The volute may at least partially define the internal aerodynamic surface of the compressor assembly. Additionally, the compressor assembly may include a compressor impeller, diffuser, and variable geometry mechanism each of which may partially define the internal aerodynamic surface of the compressor assembly. The variable geometry mechanism of the compressor assembly may include a plurality of movable vanes.

An internal combustion engine incorporating the disclosed turbocharger assembly is also provided. The internal combustion engine may include an exhaust gas recirculation system operable to recirculate exhaust gas through the internal combustion engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
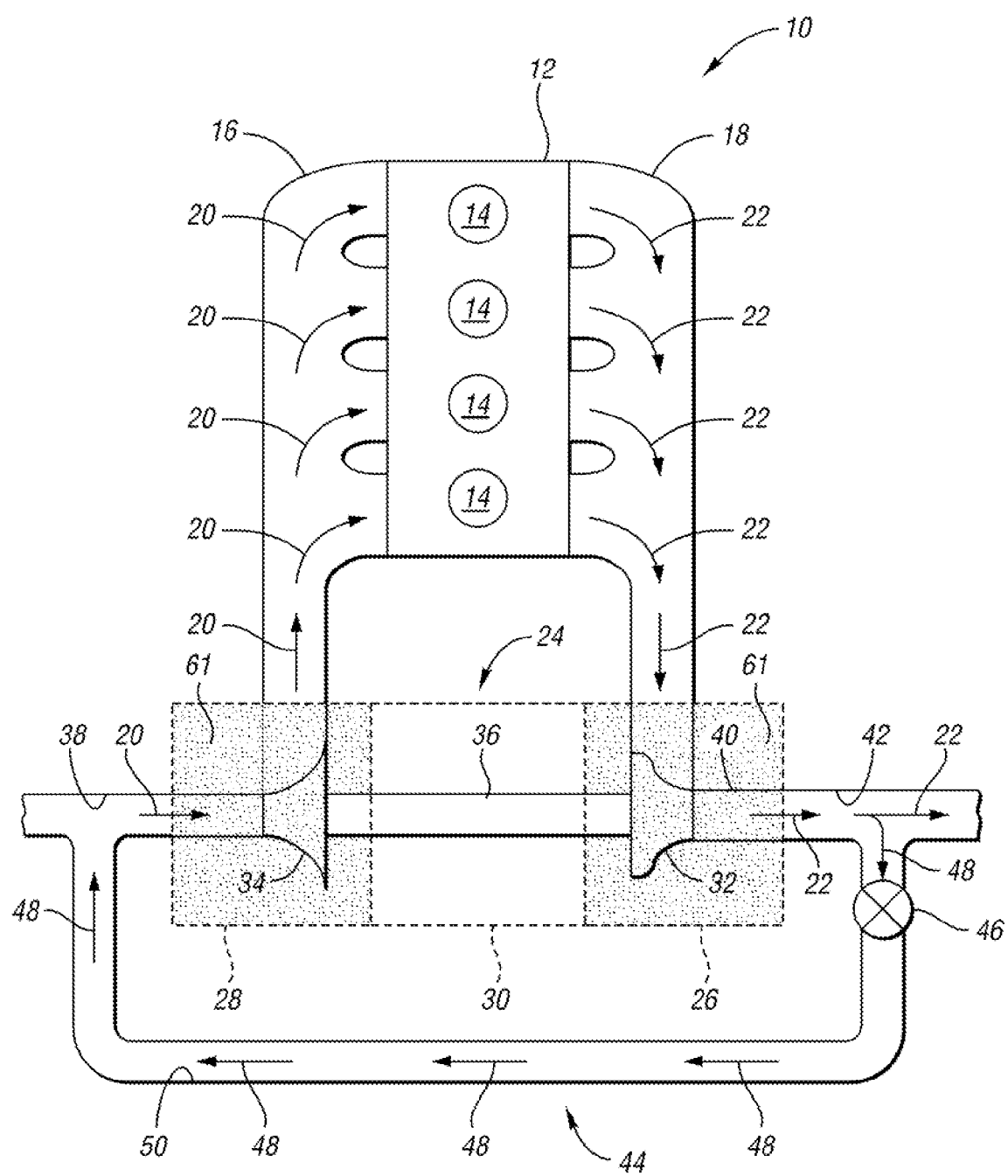
FIG. 1 is a schematic diagrammatic illustration of an internal combustion engine having a turbocharger assembly mounted thereto.

Referring to FIG. 1, there is shown a schematic illustration of an internal combustion engine, generally indicated at 10. The internal combustion engine 10 may be a compression ignited or spark ignited type internal combustion engine. The internal combustion engine 10 includes an engine block 12 defining a plurality of cylinders 14. Although four cylinders 14 are shown in FIG. 1, those skilled in the art will recognize that engines having an alternative number of cylinders, such as one, two, four, six, eight, ten, and twelve, may be used while remaining within the scope of that which is claimed. An intake manifold 16 and an exhaust manifold 18 are mounted with respect to the internal combustion engine 10. The intake manifold 16 operates to communicate inlet gases 20, such as air, recirculated exhaust gases (EGR), etc., to the cylinders 14 of the internal combustion engine 10. The cylinders 14 at least partially define a variable volume combustion chamber operable to combust the intake gases 20 with a fuel, not shown. The products of combustion or exhaust gases 22 are expelled from the cylinders 14 into the exhaust manifold 18.

The internal combustion engine 10 includes a turbocharger assembly 24. The turbocharger assembly 24 includes a turbine assembly 26, a compressor assembly 28, and a center housing 30. The turbine assembly 26 includes a turbine wheel 32 rotatable within the turbine assembly 26. Similarly, the compressor assembly 28 includes a compressor impeller 34 rotatable within the compressor assembly 28. The center housing 30 rotatably supports a shaft 36 operable to interconnect the turbine wheel 32 with the compressor impeller 34. As such, the turbine wheel 32 and compressor impeller 34 rotate unitarily. The compressor assembly 28 is provided in fluid communication with an inlet duct 38 operable to introduce inlet gases 20 to the turbocharger assembly 24. The compressor assembly 28 is also provided in fluid communication with the intake manifold 16 to introduce inlet gases 20 thereto. Additionally, the turbine assembly 26 is provided in fluid communication with the exhaust manifold 18 to receive exhaust gases 22 therefrom. Exhaust gases 22 are communicated from an outlet 40 to an exhaust discharge pipe 42 for subsequent release to the atmosphere.

The internal combustion engine 10 includes an exhaust gas recirculation, or EGR, system 44. The EGR system 44 includes a valve 46 operable to selectively and variably communicate a portion 48 of the exhaust gases 22 into a passage 50 for subsequent introduction to the inlet duct 38. The portion 48 of the exhaust gases 22 may be introduced to the passage 50 either upstream or downstream of the turbine assembly 26. Those skilled in the art will recognize that the use the EGR system 44 has proven to be an effective means of reducing certain emission constituents, such as oxides of nitrogen.

In operation of the internal combustion engine 10, exhaust gases 22 are expelled from the cylinders 14 into the exhaust manifold 18. The exhaust gases 22 are ducted into the turbine housing 26 where a portion of the energy contained within the exhaust gases 22 is utilized to spin or rotate the turbine wheel 32. The exhaust gases 22 are then communicated to the exhaust discharge pipe 42. The rotating turbine wheel 32 will cause the compressor impeller 34 to spin or rotate by virtue of the shaft 36. The rotating compressor impeller 34 will induct inlet gases 20 into the compressor assembly 28 where the inlet gases 20 are pressurized and introduced to the intake manifold 16 for introduction to the cylinders 14. By increasing the pressure within the intake manifold 16, the density of the inlet gases 20 is increased thereby enabling a greater amount of fuel to be oxidized and combusted within the cylinders 14 thereby increasing the peak pressure within the cylinders. As such, a greater amount of power may be produced from a turbocharged internal combustion engine compared to a naturally aspirated internal combustion engine of the same displacement. The turbocharger assembly 24 will be discussed in greater detail hereinbelow with reference to FIG. 2.

Figure 2:
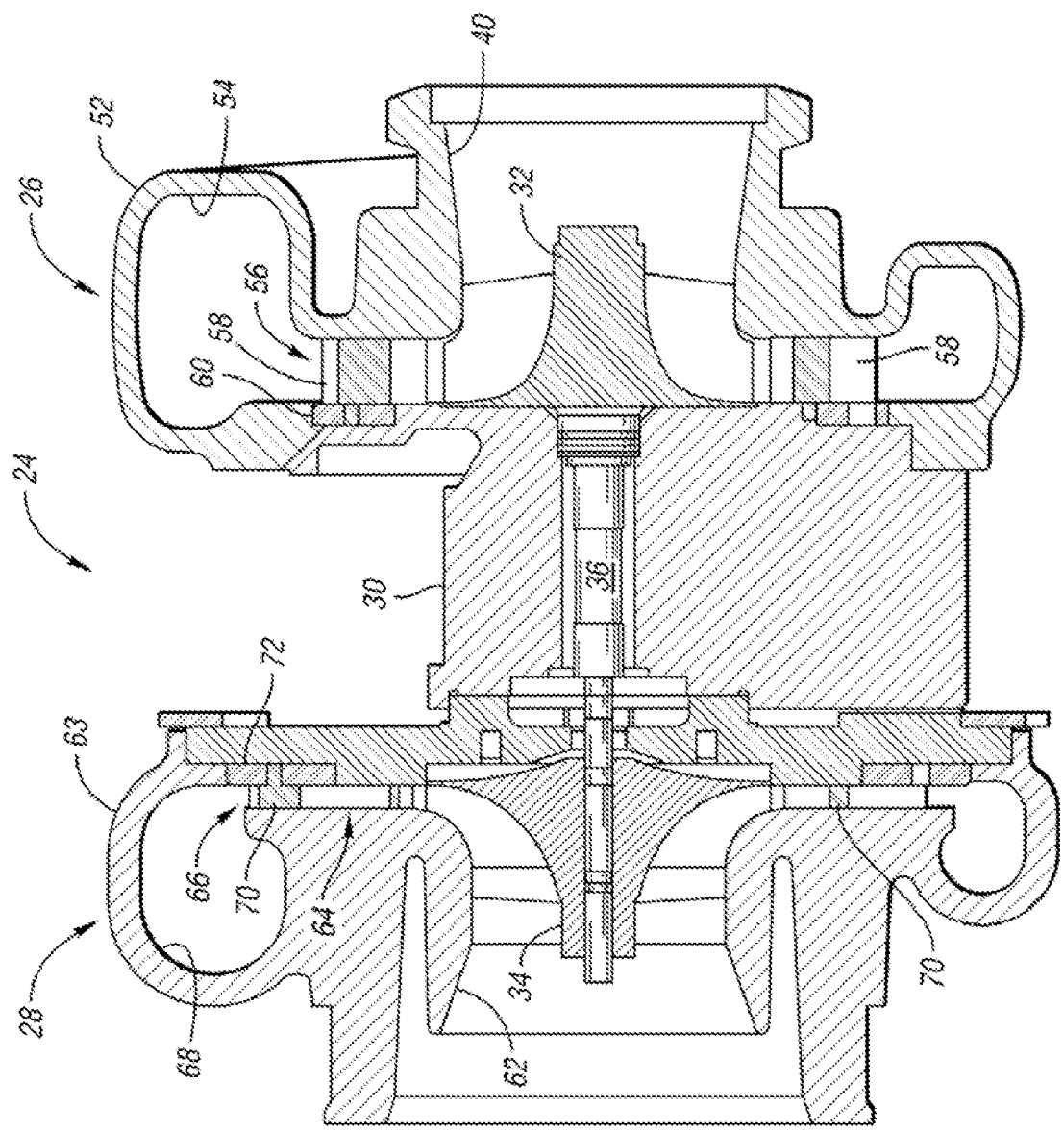
FIG. 2 is a cross sectional view of the turbocharger assembly shown schematically in FIG. 1.

FIG. 2 is a cross sectional view illustrating an exemplary embodiment of the turbocharger assembly 24 of FIG. 1. The turbine assembly 26 includes a turbine housing 52. The turbine housing 52 defines a scroll or volute 54 operable to direct exhaust gases 22 radially inwardly toward the turbine wheel 32 to effect rotation thereof. The turbine assembly 26 further includes a variable geometry mechanism 56 operable to vary the flow pattern of the exhaust gases 22 from the volute 54 to the turbine wheel 32. The variable geometry mechanism 56 of the turbocharger assembly 24 includes a plurality of radially arranged vanes 58 disposed about the turbine wheel 32. The vanes 58 are preferably movable in unison through an actuation means such as a control ring 60. Those skilled in the art will recognize that other variable geometry mechanisms may be used within the turbine assembly 26 while remaining within the scope of that which is claimed.

Portions of the volute 54, variable geometry mechanism 56, turbine wheel 32, and outlet 40 at least partially constitute the internal aerodynamic surfaces of the turbine assembly 26. The internal aerodynamic surfaces are surfaces in contact with the exhaust gases 22 as the exhaust gases 22 flow through the turbine assembly 32. Consistent with the present invention, at least a portion of at least one of the internal aerodynamic surfaces is preferably coated with a catalyst material 61, shown schematically in FIG. 1. The catalyst material 61 must be durable and activatable within the range of temperature of the exhaust gases 22. Additionally, the catalyst material 61 is preferably effective in the oxidation of hydrocarbons such that any hydrocarbon material coming in contact with the catalyst material 61 will oxidize and burn and therefore not be deposited on the respective internal aerodynamic surface. This is especially beneficial since excessive hydrocarbon deposits within the turbine assembly 26 may cause the variable geometry mechanism 56 to malfunction and/or reduce the flow efficiency of the turbine assembly 26.

The compressor assembly 28 includes a compressor housing 63, which defines an inlet 62 operable to direct inlet gases 20 axially toward the compressor impeller 34. The compressor assembly 28 further includes a diffuser section 64 operable to reduce the speed of the inlet gases 20 and a variable geometry mechanism 66 operable to vary the flow pattern of the inlet gases 20 from the compressor impeller 34 to a volute 68 defined by the compressor housing 63. The variable geometry mechanism 66 of the turbocharger assembly 24 includes a plurality of radially arranged vanes 70 disposed about the compressor impeller 34. The vanes 70 are preferably movable in unison through an actuation means such as a control ring 72. Those skilled in the art will recognize that other variable geometry mechanisms may be used within the compressor assembly 28 while remaining within the scope of that which is claimed.

Portions of the inlet 62, compressor impeller 34, diffuser 64, variable geometry mechanism 66, and volute 68, at least partially constitute the internal aerodynamic surfaces of the compressor assembly 28. The internal aerodynamic surfaces are surfaces in contact with the intake gases 20 as the intake gases 20 flow through the compressor assembly 28. Consistent with the present invention, at least a portion of at least one of the internal aerodynamic surfaces is preferably coated with a catalyst material 61. The catalyst material 61 must be durable and activatable within the range of temperature of the inlet gases 20. Additionally, the catalyst material 61 is preferably effective in the oxidation of hydrocarbons such that any hydrocarbon material coming in contact with the catalyst material 61 will oxidize and burn and therefore not be deposited on the respective internal aerodynamic surface. This is especially beneficial since excessive hydrocarbon deposits, such as those that may occur as a result of operation of the EGR system 44, within the compressor assembly 28 may cause the variable geometry mechanism 66 to malfunction and/or reduce the flow efficiency of the compressor assembly 28.

The catalyst material 61 provided on the internal aerodynamic surfaces of the turbine assembly 26 and the compressor assembly 28 may include surface binding material, precious metals (platinum, palladium, etc), stabilizers, activity enhancers, and carriers produced by certain thin layer catalyst washcoat technologies. Additionally, the catalyst material 61 is preferably operable to oxidize hydrocarbons, soluble organic fractions, and/or particulate matter over a broad range on engine operating conditions. Further, the catalyst material 61 may provide an amount of reduction of oxides of nitrogen within the turbine assembly 26.

While the best modes for carrying out the invention have been described in detail, those familiar with the art to which this invention relates will recognize various alternative designs and embodiments for practicing the invention within the scope of the appended claims.

The invention claimed is:

1. A turbocharger assembly comprising:
   a turbine assembly including;
     an outlet;
     a volute;
     a turbine wheel; and
   wherein at least one of said outlet, said volute, and said turbine wheel is at least partially coated with a catalyst material sufficient to effect burn-off of hydrocarbon deposits; and
   a compressor assembly including;
     a volute;
     a compressor impeller;
     a diffuser;

wherein said volute, said compressor impeller, and said diffuser are at least partially coated with said catalyst material.

2. The turbocharger assembly of claim 1, wherein at least one of said turbine assembly and said compressor assembly includes a variable geometry mechanism, and wherein said variable geometry mechanism is at least partially coated with said catalyst material.

3. The turbocharger assembly of claim 2, wherein said variable geometry mechanism includes a plurality of vanes.

* * * * *